United States Patent [19]

Salem et al.

[11] Patent Number: 5,264,162

[45] Date of Patent: Nov. 23, 1993

[54] PROCESS FOR MANUFACTURING POROUS TUBES OF HIGH PERMEABILITY MADE FROM CARBON-CARBON COMPOSITE MATERIAL, AND THEIR APPLICATION

[75] Inventors: Jean Salem, Pacy sur Eure; Christophe Bommier, Paris, both of France

[73] Assignee: Pechiney Recherche, Courbevoie, France

[21] Appl. No.: 821,807

[22] Filed: Jan. 17, 1992

[30] Foreign Application Priority Data

Jan. 18, 1991 [FR] France .................. 91 00935

[51] Int. Cl.⁵ ............................................ C04B 35/52
[52] U.S. Cl. ................... 264/29.5; 264/103; 264/323; 264/257; 423/447.1; 423/447.4; 425/393; 425/403
[58] Field of Search ............ 264/29.1, 29.5, 29.2, 264/103, 323, 257; 423/447.1, 447.4; 425/393, 403

[56] References Cited

U.S. PATENT DOCUMENTS 4,776,995 10/1988 Nelson et al. ............... 264/29.5
4,944,996 7/1990 Bauer et al. .

FOREIGN PATENT DOCUMENTS 237031 9/1987 European Pat. Off. .
2722575 12/1977 Fed. Rep. of Germany .
2488244 2/1982 France .
2582956 12/1986 France .

OTHER PUBLICATIONS

Patent Abstracts of Japan, vol. 9, No. 159 (E-326)(1882) Jul. 4, 1985, & JP-A-60 37 664 (Fuji Denki) Feb. 27, 1985.
Patent Abstracts of Japan, vol. 13, No. 575 (C-667)(3923) Dec. 19, 1989 & JP-A-1 239 061 (NKK Corp) Sep. 25, 1989.

Primary Examiner—Jeffery Thurlow
Assistant Examiner—Mathieu Vargot
Attorney, Agent, or Firm—Dennison, Meserole, Pollack & Scheiner

[57] ABSTRACT

A process for manufacturing porous tubes made from carbon-carbon composite material by winding over a mandrel a non-woven sheet, made from a carbon fiber precursor, followed by compression and hot stabilisation of the assembly, with impregnation of the compressed sheet by a resin, followed by a thermal carbonisation treatment of the resin. Tubes are obtained having high permeability, small pore diameter and an inner surface of low rugosity. The tubes produced ar particularly suitable for the manufacture of filtration elements and of filtering membrane supports.

22 Claims, 5 Drawing Sheets

PROCESS FOR MANUFACTURING POROUS TUBES OF HIGH PERMEABILITY MADE FROM CARBON-CARBON COMPOSITE MATERIAL, AND THEIR APPLICATION

FIELD OF THE INVENTION

The invention relates to the manufacture of porous tubes made from carbon-carbon composite material and the applications of tubes manufactured according to the invention.

REMINDER OF THE PRIOR ART

Porous tubes are extensively used, principally in separation techniques either as filtering elements or as filtering membrane supports. In separation techniques, the processes such as reverse osmosis, ultrafiltration and microfiltration employ either organic membranes or, as has been the case for several years now, inorganic membranes. Depending on the type of use, these membranes must possess pore dimensions which are small and appropriate to the envisaged use, a minimal thickness in order to permit a small pressure drop in the filtration (high permeability), and they require a support having good mechanical properties, high permeability and a pore diameter adapted to that of the membrane.

The importance of carbon-carbon (C—C, for short) composite materials is already known for producing filtration membrane supports having good mechanical properties. Furthermore, these supports made from C—C composite exhibit a high chemical inertness which results in an absence of contamination of the filtrate and in an absence of corrosion of the support, at least under the usual conditions of use.

Thus, French patent no. 2,582,956 and corresponding U.S. Pat. No. 4,944,996 owned by the assignee of the present invention, describe an inorganic membrane support constituted by a C—C composite material of low thickness in which the fibrous substrate is constituted by textile made from carbon (fibres and/or fabric and/or felt), optionally associated with a mat of randomly disposed fibres. Such a support made from composite material, although of low thickness, exhibits sufficient mechanical properties, in particular burst, crush and flexural strength in the case of tubes. According to this patent, tubes made from carbon-carbon composite may be obtained by fabric winding, impregnation by a resin, polymerisation and carbonisation of the resin, or even by "pultrusion."

POSING THE PROBLEM

The porous C—C composite materials described in FR 2,582,956 and used as membrane supports already exhibit high performance, but the Applicant has observed that they were not adapted as thin membrane supports because of the irregularity of their surface: in fact, the thinner the membrane and the smaller the pore diameter, the more the surface of the support in contact with the membrane must be uniform and non-rugose, otherwise it is difficult, indeed impossible, to deposit a membrane of uniform thickness. The surface irregularities lead to a weakening of the membrane. For example, maybe "puncturing" of the membrane may occur within the large surface defects of the support. Furthermore, the surface irregularities of the support may be transmitted, at least partially, to the surface of the membrane itself. Now, the surface of the membrane must exhibit as few asperities as possible and have the minimum possible rugosity so as to be able to be cleaned and unclogged easily.

The Applicant therefore has pursued its research in order to solve this problem.

It has also sought to improve the performance of the porous tubes and, more precisely, to perfect the porous tubes made from C—C composite material exhibiting, simultaneously, a smooth surface, a high permeability and a small pore diameter, which tubes may be used either as membrane supports or as filtering membranes.

The subject of the process according to the invention is therefore the manufacture of porous tubes, which are long in relation to the largest diameter, made from C—C composite material, which tubes are of high permeability and have good mechanical properties whilst exhibiting a filtering surface of low rugosity and of small pore diameter.

DESCRIPTION OF THE SOLUTION

The process for manufacturing a porous tube made from carbon-carbon composite material comprises, according to the invention, winding a carbonaceous sheet in such a way as to form a fibrous substrate having the shape of a tube and the densification of this substrate by formation of a porous carbonaceous matrix, and is characterised in that:

a) a non-woven sheet (2) of carbon fibre precursor of apparent density between 0.005 and 0.05 is wound over a mandrel (1) having a smooth surface of low rugosity and the sheet (2), wound on its mandrel (1), is introduced into a flexible, mechanically solid sheath (3) in such a way as to hold the said wound package tight, b) the wound sheet is compressed with the aid of compression means enabling the thickness of the wound package to be homothetically reduced in relation to the central axis (8) of the tube, in such a way as to obtain a fibrous substrate, uniformly compressed on the mandrel (1), of apparent density between 0.2 and 0.6 and it is subjected, during or after the compression, to a thermal treatment in order to solidify and stabilise the fibrous substrate (5) in the form of a profile, which it is then possible, optionally, to carbonise.

c) if necessary, after having withdrawn the sheath (3), the fibrous substrate profile (5) is impregnated with a resin and the said resin is polymerised so as to obtain a rigid profile (6) having a matrix of polymerised resin.

d) the said rigid profile (6) is brought to a temperature between 700 and 1300° C. in order to carbonise it, the mandrel (1) having been withdrawn either before the carbonisation, if necessary, or, preferably, after the carbonisation, in such a way as to obtain a tube having high permeability, small pore diameter and an inner surface of low rugosity and apparent density between 0.5 and 1.2.

The research carried out has shown the importance of using non-woven sheets of carbon fibre precursor and, preferably, a non-woven sheet in the form of a mat of precursor in the preoxidised state. In fact, a mat, on the one hand, enables the desired properties (low surface rugosity, high permeability and small pore diameter) to be simultaneously obtained, which is not the case with woven sheets, doubtless because of the ordered and anisotropic structure of the one (woven sheet) compared to the disordered and relatively isotropic structure of the other (mat sheet). On the other hand, it has been observed that it is important to shape the fibrous carbon substrate in the form of precursor in the preoxidised state. Perhaps this is due to the fact that, in the preoxidised state, the carbon fibre precursor is still thermoplastic.

More precisely, has been observed that a C—C composite material obtained according to the invention from a non-woven substrate such as a mat of carbon fibre precursor in the preoxidised state made it possible:

on the one hand, to preserve good mechanical properties, substantially comparable to those obtained with a substrate comprising a carbon fibre fabric;

on the other hand, to improve the uniformity of the surface of the C—C composite material, in comparison with a material whose fibrous substrate is a woven fabric;

finally and above all, to increase to a great extent, the permeability of the porous composite material with a sufficient pore diameter. Up to at least 25 times the permeability obtained according to the prior art has been reached, with a sufficient pore diameter, which is significant and of the greatest importance from a practical standpoint.

The sheet of carbon fibre precursor according to the invention is preferably a mat of carbon fibre precursor in the preoxidised state (PAN fibre after a thermal treatment generally at about 200° C.).

The mat is a non-woven sheet constituted by a random dispersion of relatively short fibres oriented on average in the plane constituted by the mat layer. This is a random orientation of fibre segments which constitutes an entanglement connecting the segments together and enabling the sheet thus constituted to be handled. These fibre segments or carbon fibre precursors have an average length between 1 and 100 mm and, preferably, between 20 and 80 mm.

The surface mass of the starting mats is generally between 50 and 200 g/m$^2$ and their apparent density is approximately 0.01.

The mat according to the invention may be easily needled.

According to the invention, it is possible to introduce into the mat, before or at the time of winding, a dispersed filler such as a fine inert powder made from refractory or carbonaceous material, in particular in order to enable the diameter of the pores to be adjusted at the desired location, for example in the portion of the mat corresponding to the inner surface of the tube. This filler may also be constituted by ground fibres made from material which is inert, especially towards carbon (carbon fibres, glass fibres, silicon carbide fibres etc.), which fibres are capable of modifying the diameter of the pores.

In particular, it is advantageous thus to modify only a portion of the mat, that corresponding to the inner surface of the final tube, in such as way as to have a porous tube with an asymmetrical structure, typically with a pore diameter 10 times smaller for the modified inner portion than for the non-modified adjacent portion. In fact, especially in the case where the tube made from C—C composite material must act as support to a membrane which is very thin and has very fine pores, a support having a very uniform inner surface and having adapted porosity is particularly desired. It is important to note that these properties are obtained without significantly reducing the permeability of the support because a low thickness of the support has been modified on diminution of the pore diameter.

Moreover, a porous composite tube, one face, generally the inner face, of which has been thus modified may, optionally, be used as it is as a filtering element without addition of a membrane.

The fillers which can be used for reducing the pore diameter have an average particulate size between 0.1 and 10 μm and in the portion of the porous tube where they are present, preferably the inner portion, they occupy a volume fraction between 1 and 20% of the total volume and, preferably, between 5 and 10% of the total volume.

Moreover, it is advantageous, in order to reinforce the asymmetry of the porous tube and consequently to increase the filtration rate, to use successive mat layers making it possible to obtain, in the final tube, pore diameters which increase in the direction of the flux to be filtered, that is to say generally from the inside towards the outside of the porous tube. It is advantageous that these pore diameters are substantially in a ratio of 10 between one layer and the next, which may be obtained by adjusting the density of the mat and/or the diameter of the fibres.

The mandrel (1) over which the mat layer is wound is a profile made from material which is rigid enough not to be deformed by the compression means (4), especially by its passage through a die. It has a cross-section substantially corresponding to the inner cross-section of the porous tube made from C—C composite material according to the invention.

Although a circular cross-section is the most common for a tube, the invention is not limited to this cross-section. Any non-concave cross-section may be suitable as it enables a sheet to be wound whilst keeping close contact between the sheet and the mandrel acting as support, a contact which is necessary in order to provide, by extrusion, an isotropic compression of the mat.

The mandrel is composed of a material which is thermally stable at least up to the temperature of polymerisation of the resin, that is to say about 150-200° C. According to the invention, the mandrel may be a rod or a tube made from carbon, from graphite, from PTFE, from metal or metal alloy or from metal or metal alloy covered with PTFE. It is convenient to use a copper tube because of its good surface finish, its high thermal conductivity, its high melting point and its expansion during the thermal carbonisation treatment.

Figure 1:
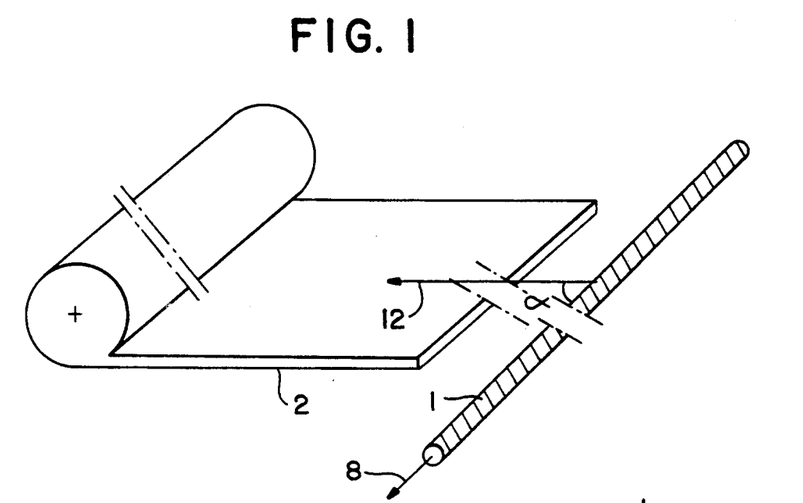
FIG. 1 is a perspective diagram of a reel of mat (2) and the mandrel (1) over which the web of mat will be wound. The reel of mat is in the form of a web which is long in relation to its width and its direction (12) is indicated by an arrow parallel to the long sides of the web. The direction (12) of the web makes an angle $\alpha$, substantially equal to 90°, with the axis (8) of the mandrel in the case of FIG. 1.
Figures 1A, 1B, 3:
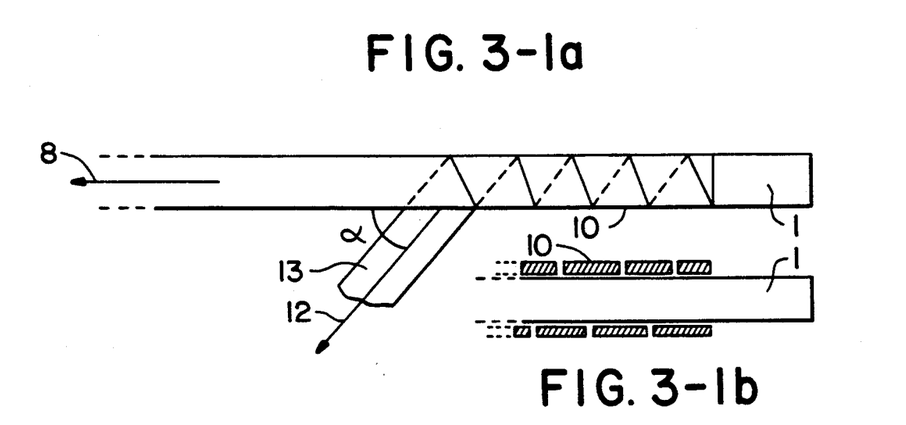
Figure 2:
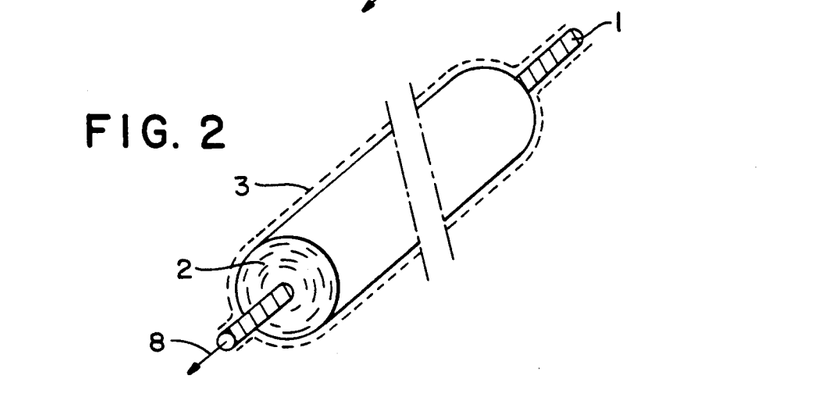
FIG. 2 is a perspective diagram of the web of mat (2) wound over the mandrel (1) and surrounded by the sheath (3).
Figures 2A, 3:
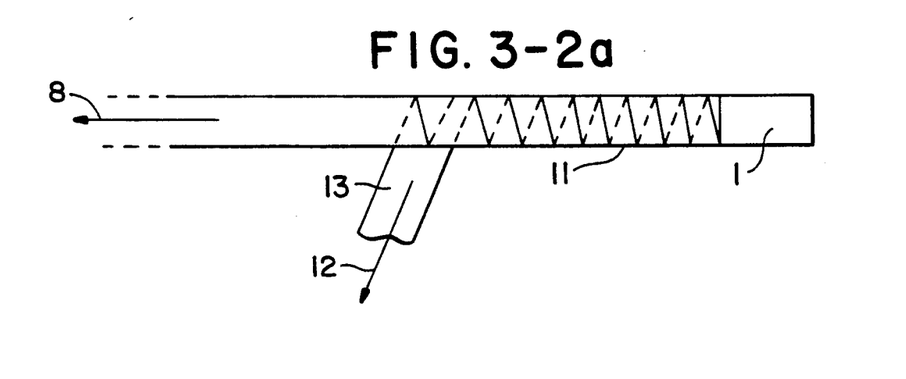
Figures 2B, 3:
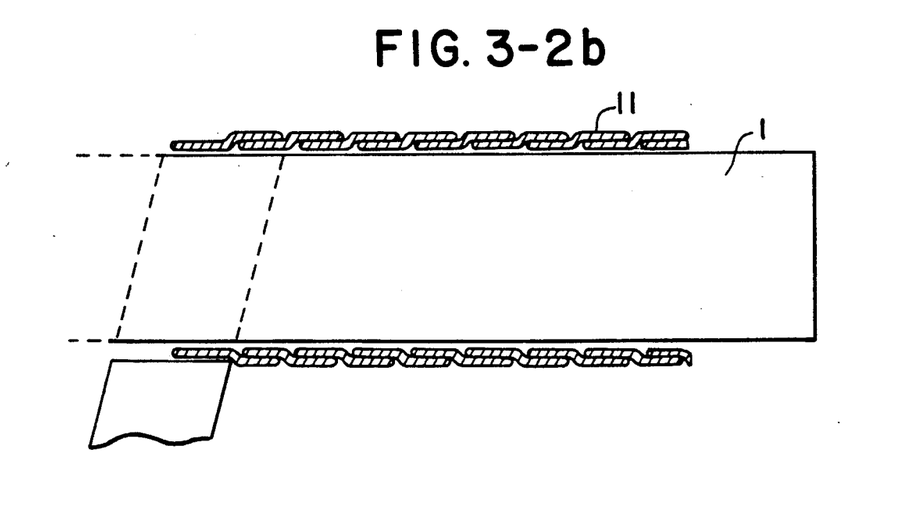

In order to describe the various ways of winding the sheet (2) over the mandrel (1), consideration is taken of the relative position of the axis (8) of the mandrel (1) and of the direction (12) of the sheet (2) (represented by an arrow parallel to the long sides of the sheet - see FIG. 1). This relative position may be expressed by the angle α which the direction (12) of the sheet makes with the axis (8) of the tube.

Figure 22:
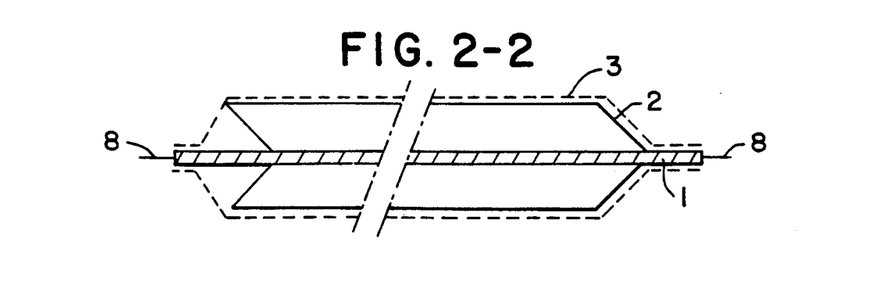

The winding of the non-woven sheet over the mandrel may be performed conventionally while presenting the sheet in such a way that the direction of the sheet is substantially perpendicular to the axis (8) of the mandrel, the width of the sheet being slightly less than the length of the mandrel and possibly reaching 1500 mm. It is advantageous to choose an angle α very slightly different from 90° in order to have a winding with a conical end, as shown in FIG. 2—2.

It is also possible to wind, not a sheet of large width, but one or more strips (13) of smaller width in such a way as to obtain either contiguous turns (10) as illustrated in FIGS. 3—1a and 3—1b or overlapping turns (11) as illustrated in FIGS. 3—2a and 3—2b. It is also possible to wind several strips alternating the direction of winding and therefore the sign of the angle α, this being done so as to improve the mechanical properties.

When it is desired to modify the surface pore diameter by addition of fine inorganic filler it is convenient to form the first layer of the wound package by winding with contiguous turns of a strip containing a fine inorganic filler and to continue the winding by forming the next layers either with other strips or with a sheet of large width, unfilled.

Calculation and/or experiment makes it possible to determine the number of mat layers or turns to be obtained per winding, as a function especially of the properties of the starting mat, of the compression ratio in the die and of the thickness of the final composite material etc.

Figure 4A:
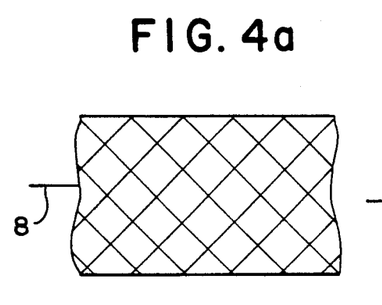
FIGS. 4a and 4b are diagrams, in cross-section along the axis (8) of the mandrel (1), of a woven braid having a variable cross-section in two states: in 4a, before traction on the braid, the braid exhibits a large cross-section whereas in 4b, the braid, after a traction, is elongated and its cross-section is reduced.
Figure 4B:
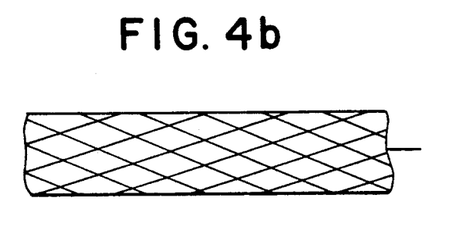

After winding the sheet over the mandrel, the assembly is placed inside a sheath whose function is firstly to preserve the wound package of the sheet, to facilitate the handling of the wound sheet and the sliding of the latter within the compression means (4). Typically, the sheath is either a woven braid made from flexible carbon or a braid made from natural or synthetic fibres or even a plastic film which is preferably heat-shrinkable, in order that there are no folds and excess thicknesses, and thermally stable at least up to 200° C. In order that the sheath does not form folds or excess thickness, which hamper the compression, it is preferred according to the invention either to choose a woven braid having a variable cross-section depending on the traction exerted on the braid, as illustrated in FIGS. 4a and 4b, or to use an open braid of the fishing-net type, that is to say possessing good mechanical properties, high fineness and a specific surface area, occupied by the material constituting the braid, which is relatively low in relation to the total surface area of the braid, in every case representing less than 30% of the latter, which is easy to obtain with fine yarns.

It is preferred, according to the invention, to choose an open braid having good mechanical properties, initially and/or after the thermal carbonisation treatment, in such a way as to be able to preserve the braid during the phase of impregnation by the resin and furthermore to have, if possible, a mechanical reinforcement of the final porous tube by virtue of the outer braid, and this being done without significantly reducing the permeability.

The compression of the "mandrel+wound sheet+sheath" assembly is carried out with the aid of compression means (4), typically a die, of inner profile homothetic to that of the mandrel (1) in order to compress the mat generally 20-to 60-fold and obtain after extrusion a compressed sheet having an apparent density between 0.2 and 0.6.

It is also important to solidify and stabilise the structure of the sheet in the compressed state by virtue of a thermal treatment between 100° and 400° C.

Figure 5A:
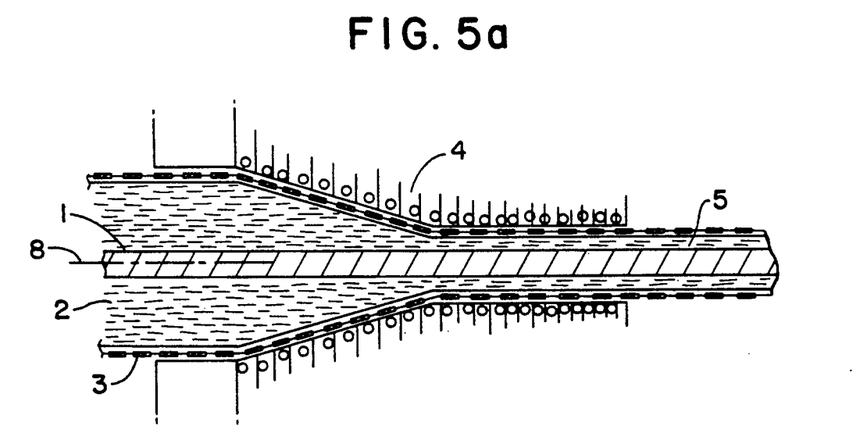
FIG. 5a is a diagram, in cross-section along the axis (8) of the mandrel (1), of the compression of the "mandrel (1)+wound sheet (2)+sheath (3)" assembly with the aid of a heated die (4).

The compression step and the step for stabilising the compressed sheet are combined according to the following methods:

According to a first method, a compression of the sheet is carried out hot (see FIG. 5a).

The compression conditions are as follows:
compression, typically in a heated die, at a temperature between 150° and 400° C.
the speed of passing through is between 0.1 and 10 m/min.

It is important that the compressed mat has a sufficient dwell time in the die in order to solidify the structure of the mat in its compressed state. This dwell time is generally between 10 and 500 s.

It is possible to have a single die or also a succession of dies ensuring a progression in the compression and therefore having increasingly smaller inner cross-sections.

According to another method of the invention, it is possible to carry out the compression cold, for example with the aid of a die made from PTFE, and then to heat the profile of the fibrous substrate obtained on exiting the die.

For this, the fibrous substrate profile exiting the die is introduced into a metal tube (9) which may be either mechanically integral with the die or detachable from the latter.

In the first case (see FIG. 5b), the metal tube (9) is fixed and provided with heating means, which makes it possible to obtain, on exiting the tube, a stabilised fibrous substrate profile by adjusting the temperature and the dwell time in the tube.

Figure 5B:
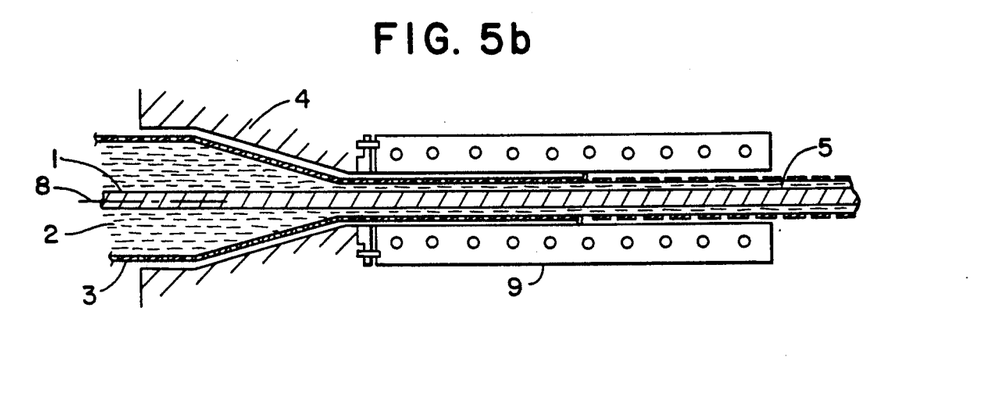
FIG. 5b is a diagram in cross-section along the axis (8) of the mandrel (1), of the "mandrel (1)+wound sheet (2)+sheath (3)" assembly with the aid of a nonheated die (4) extended by a heated metal tube (9) fixed integrally with the non-heated die.
Figure 5C:
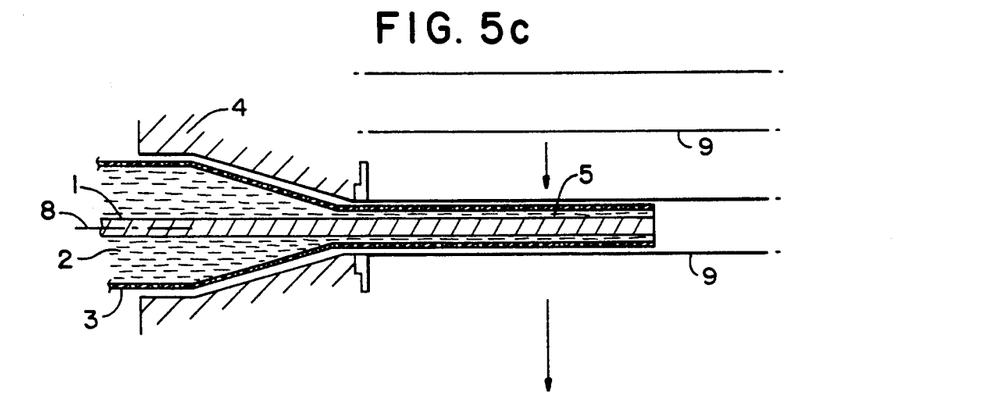
FIG. 5c is a diagram, in cross-section along the axis (8) of the mandrel (1), of the compression of the "mandrel (1)+wound sheet (2)+sheath (3)" assembly with the aid of a non-heated die (4) extended by a moveable metal tube (9) which, one filled, is replaced by an empty tube and is itself transferred into an oven (14) in order to undergo the thermal stabilisation treatment.
Figure 5D:
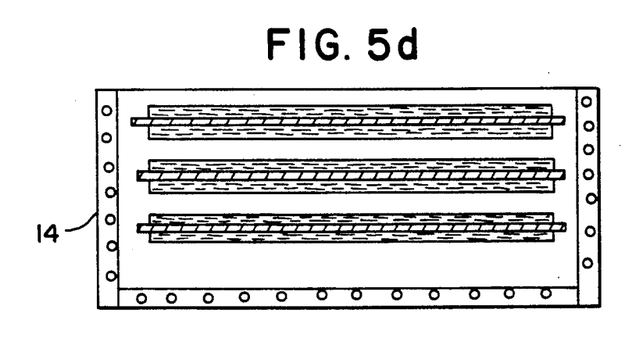

In the second case, the metal tube has substantially the length of the final porous tube and once "full," it is replaced by an "empty" tube, the "full" tube being then placed in an oven (14) in order to stabilise the fibrous substrate (see FIG. 5c).

After the compression and stabilisation phase, a substrate profile, compressed to a stabilised geometry, is obtained which may optionally be carbonised before impregnation.

The external sheath (3) may then be removed if it risks impairing a homogeneous impregnation of the fibrous substrate (5) by the carbonisable resin and the permeability of the support, but, as indicated previously, the sheath may be preserved if it is an open sheath.

The impregnation of the fibrous substrate (5) by a carbonisable resin is carried out in a known manner, likewise the polymerisation of the resin is carried out generally at a temperature between 150° and 250° C. The resin used for the impregnation belongs to the group of resins usually used to constitute the carbonaceous matrix and to densify the fibrous substrate acting as reinforcement. Mention may be made, in a non-limiting manner, of phenolic and furan resins and pitch-furfural mixtures catalysed with ethyl sulphate etc.

Figure 6:
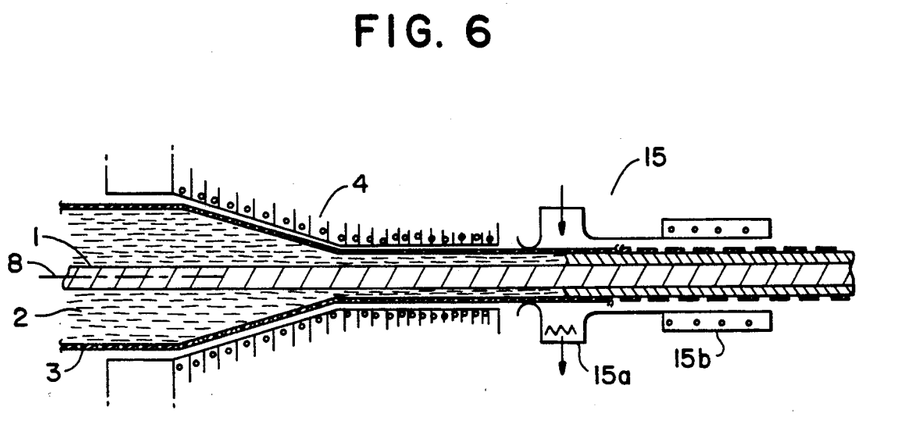
FIG. 6 is a diagram, in cross-section along the axis (8) of the mandrel (1), of an assembly constituted by a heating die (4) constituting a compression means and a device (15) comprising a portion (15a) forming a cavity in which the impregnation, by the resin which circulates and flows from top to bottom in the cavity, is carried out and comprising a tube-shaped portion (15b) enabling the excess resin to be dried off and then the resin to be polymerised, at least partially, so as to obtain profiles which can be handled.
Figure 7:
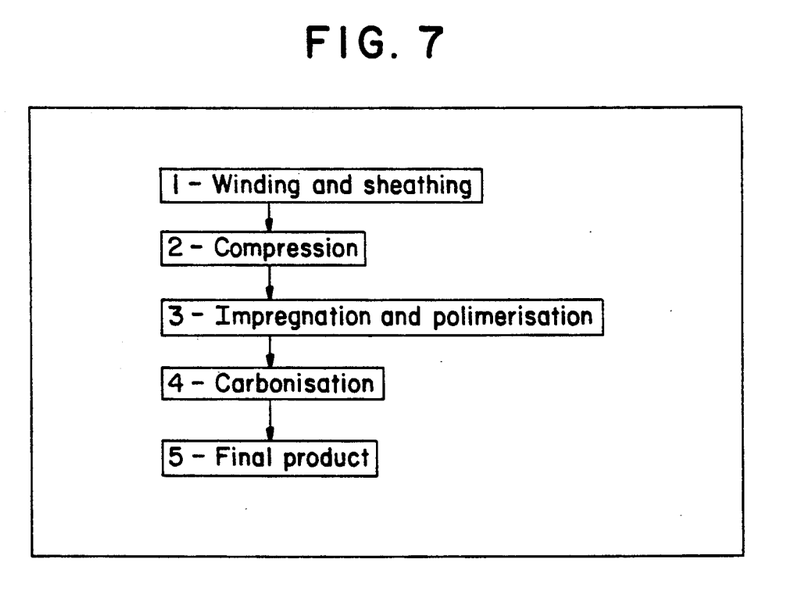
Figure 21:
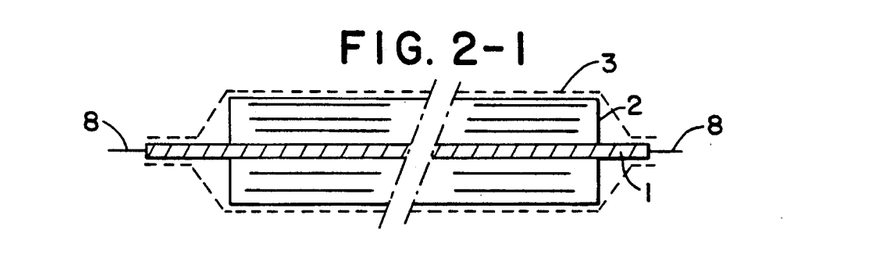

The fibrous substrate (5) may be continuously impregnated directly after the latter has undergone its thermal stabilisation treatment, as shown diagrammatically in FIG. 6, especially since the fibrous substrate (5) leaving at a temperature ranging from 150° to 400° C. makes the resin fluid and thus facilitates its penetration into the fibrous substrate as far as the mandrel.

It is then convenient to add to the impregnation device (15a) a heating device (15b) for polymerising, at least partially, the resin in such a way as to permit easy handling of the impregnated fibrous substrate profiles.

The product obtained after the polymerisation phase is a profile (6) made from non-porous rigid composite material, such that it is possible, at this stage, to remove the mandrel (1). This is necessary when the mandrel is made from a material or contains a material unable to withstand the high temperatures required for carbonizing the resin, for example in the case where a mandrel containing PTFE is used. Moreover, it has been observed that it was advantageous to keep the mandrel (1) at high temperature during the thermal treatment when the said mandrel has an expansion coefficient sufficient in order to expand against the inner surface of the fibrous substrate profile having a resin matrix and, consequently, to contribute to the further reduction of the rugosity of the inner surface. Furthermore, in this case and taking account of the relative expansion coefficients of the mandrel and of the composite porous tube obtained, the mandrel (1) is easily separated from the composite porous tube after returning to ambient temperature. This happens especially in the case of a mandrel made from metal or metal alloy, preferably in the case of a mandrel made from copper (rod or copper tube).

The thermal carbonisation treatment of the profile (6) made from non-porous rigid composite material is known per se. Typically, it takes place at a temperature between 700° and 1300° C. According to the invention, a temperature of 800–900° C. is chosen if the mandrel is made from copper and a higher temperature is chosen if the mandrel is made from graphite or if it is removed, for materials, temperature-withstand reasons.

According to the invention, it is possible, as is known from French patent no. 2,582,956, to adapt the porosity of the composite porous tube by a succession of densification treatments, whether there takes the form of resin impregnation plus carbonisation or densification by CVD (chemical vapour-phase deposition).

The final density of the composite material constituting the porous tube obtained after densification of the fibrous substrate is between 0.5 and 1.2 and preferably between 0.8 and 1 so as to have, simultaneously, sufficient mechanical properties and permeability.

The results obtained according to the invention are particularly surprising especially as regards the permeability, which is at least 25 times greater, for a similar pore diameter, for the support according to the invention (Example 1) than for the support according to the prior art (Example 2).

The process of the invention makes it possible to obtain profiled tubes having a porous wall exhibiting, simultaneously, a very smooth inner surface, very fine pores, high permeability and good mechanical properties. Furthermore, the porous wall may have a controlled differential porosity and, more particularly, exhibit a surface pore diameter different (and generally smaller) from that within the wall, by virtue of the wall effect and/or the introduction of filler.

All these properties constitute a great improvement in relation to the prior art.

The porous tubes obtained according to the invention can be used in the field of filtration as membrane supports or as filtering elements of fluids, liquids or gases loaded with solid particles.

DESCRIPTION OF THE FIGURES

FIGS. 2—1 and 2—2 are diagrams of a view of the web of mat (2) wound over the mandrel (1) and surrounded by the sheath (3), in cross-section along the axis (8) of the mandrel (1), with a winding at an angle $\alpha$ equal to 90° for FIG. 2—1 and an angle $\alpha$ very slightly different from 90° for FIG. 2—2 enabling a conical end to be obtained which facilitates the introduction of the assembly into the compression device (4) shown in FIGS. 5a, 5b, 5c.

FIG. 3—1a shows a perspective view of a wound package having contiguous turns (10) of a strip (13) of mat over the mandrel (1). FIG. 3—1b is a view, in partial cross-section, of the same wound package. In the case of contiguous turns, there is, between the width 1 of the strip (13), the angle $\alpha$ and the radius r of the cylindrical mandrel, the relationship:

$$l = 2 \cdot \pi \cdot r \cdot \cos \alpha$$

FIG. 3—2a shows a perspective view of a wound package having overlapping turns (11) of a strip (13) of mat over the mandrel (1). FIG. 3—2b is a view, in partial cross-section, of the same wound package.

FIG. 7 is a summary of the process according to the invention:
1) Winding and sheathing:
   Winding of non-woven sheet (2) over a rigid mandrel (1)—with, optionally, introduction of a dispersed filler
   Sheathing by a braid
2) Compression:
   Compression of the wound sheet and thermal stabilisation treatment—with, optionally, carbonisation of the compressed and stabilised sheet
3) Impregnation and polymerisation:
   Impregnation of resin and polymerisation of the resin
4) Carbonisation:
   Thermal carbonisation treatment
5) Final product:
   After separation from the mandrel (1), the final product is a porous tube, which is mechanically solid
which has a smooth inner surface
which has a high permeability
which has a pore diameter adapted to its use

EXAMPLES

Example 1 illustrates the invention and Example 2 the prior art.

EXAMPLE 1

The starting point is a mat of carbon fibre precursor (PAN fibre in the preoxidised state) as a sheet of 1 to 3 mm thickness and of 1.4 m width.
Properties:
 surface mass: 100 g/m:
 length (average) of the fibres: 63 mm
 apparent density: 0.01.
The sheet was wound under slight tension over a mandrel made from PTFE, of 7 mm diameter and 1.60 m length, until a wound package of mat of approximately 20 mm diameter was obtained. The wound package of mat was introduced into a carbon braid.

While pulling on the carbon braid, the wound package was compressed by extrusion with the aid of a device similar to that described in FIG. 5b, with an extrusion temperature of 250° C. and a speed range of 0.2 m/min, which corresponds to a dwell time in the die of 3 min. The die assembly used has a length of 1.80 m with a first compression portion constituted by a cold die of 200 mm length, with an inlet diameter of 25 mm and an outlet diameter of 10 mm and a second portion constituted by a heated tube of 1.60 m length and of 10 mm inner diameter.

A fibrous substrate profile of apparent density equal to approximately 0.5 was obtained. Then it was impregnated by immersion in phenolic resin after having removed the carbon braid. The resin was polymerised at 160° C. for 2 hours and then, after having withdrawn the mandrel, the profile impregnated with polymerised resin was brought to 900° C. and kept at this temperature for 6 hours in order to carbonise the assembly.

After cooling, a porous tube was obtained having the following properties:
microrugosity measured by examination of a crosssection section:
 $R_T$: 24.2–32.2 $\mu m$
 $R_A$: 3.4–3.7 $\mu m$
permeability: 775 cm$^3$/cm$^2$.s.bar
average pore diameter: 17.1 $\mu m$

EXAMPLE 2

A carbon fibre fabric, of 18 g per linear meter, was impregnated with a phenolic resin and it was wound over a mandrel made from steel, of 6 mm diameter, in such a way as to obtain a roll of approximately 9 mm diameter. The resin was polymerised and, after having withdrawn the mandrel, the tube was carbonised at a temperature greater than 1000° C. A porous tube according to the prior art was obtained having the following properties:
microrugosity:
 $R_T$: 43.7–49.8 $\mu m$
 $R_A$: 5.1–6.7 $\mu m$
permeability: 10 cm$^3$/cm$^2$.s.bar
average pore diameter: 7.4 $\mu m$

We claim:
1. Process for manufacturing a porous tube made from carbon-carbon composite material, which comprises winding a carbonaceous sheet to form a fibrous substrate having the shape of a tube followed by densification of this substrate to form a porous carbonaceous matrix, comprising the steps of:

a) winding a non-woven sheet of carbon fibre precursor of apparent density between 0.005 and 0.05 over a rigid mandrel having a smooth surface and low rugosity and introducing the sheet, wound over its mandrel, into a flexible, sheath to hold the wound non-woven sheet tight;

b) compressing the wound sheet with the aid of compression means wherein the thickness of the wound non-woven sheet is homothetically reduced in relation to the configuration of the outer surface of the mandrel to obtain a fibrous substrate, uniformly compressed on the mandrel, of apparent density between 0.2 and 0.6 and subjecting the wound sheet, during or after its compression, to a thermal treatment in order to solidify its structure in the form of a fibrous substrate profile, and optionally carbonising;

c) impregnating the fibrous profile with a resin and polymerising the resin to obtain a rigid profile having a matrix of polymerised resin; and d) bringing the rigid profile to a temperature between 700° and 1300° C. in order to carbonise it to obtain a tube having high permeability, small pore diameter and an inner surface of low rugosity and apparent density between 0.5 and 1.2.

2. Process according to claim 1, wherein in step a) the non-woven sheet of carbon fibre precursor is a mat sheet of carbon fibre precursor in the preoxidised state.

3. Process according to claim 2, wherein the said precursor mat is an entanglement of carbon fibre precursor segments, oriented randomly, of average length between 1 and 100 mm.

4. Process according to claim 1, wherein all or a portion of the said sheet contains a fine refractory inorganic filler of particulate size between 0.1 and 10 $\mu m$ to modify the pore diameter of the final tube and to obtain an asymmetrical porous tube.

5. Process according to claim 4, wherein only a portion of the said sheet corresponding to the inner windings of the said tube contain a fine inorganic filler, to reduce the pore diameter over a low thickness and over the inner face of the said tube.

6. Process according to claim 1, wherein several mat sheets having different properties are wound over a mandrel to obtain an asymmetrical porous tube exhibiting successive layers having a pore diameter varying by a factor of 10 from one layer to the next layer.

7. Process according to claim 1, several sheets in the form of non-woven strips of small width made from mat having different properties and of small width are wound over a mandrel to obtain an asymmetrical porous tube exhibiting successive layers having a pore diameter varying by a factor of 10 from one layer to the next layer and which are formed from contiguous turns or with overlap.

8. Process according to claim 7, wherein several strips are wound over a mandrel, one half being alternately wound at an angle $+\alpha$, the other half being wound at an angle $-\alpha$, to obtain improved mechanical properties.

9. Process according to claim 1, wherein the mandrel is a profile of length which exceeds 1000 mm of any constant cross-section not comprising a concave portion so that the mandrel, over all points of its surface, is in contact with the sheet and supports it.

10. Process according to claim 9, in which the mandrel is selected from the group consisting of rods and tubes having circular cross-section of diameter between 1 and 50 mm, which mandrel is made from material selected from the group consisting of graphite, metal, metal alloy, PTFE, metal covered with PTFE, and metal alloy covered with PTFE.

11. Process according to claim 10, wherein the said mandrel is a rod or a tube made from copper.

12. Process according to claim 1, wherein the sheath is a woven braid made from carbon, having a variable cross-section depending on the traction force exerted on it, to prevent forming folds during the compression of the wound sheet.

13. Process according to claim 1, wherein the sheath is a braid made from natural or synthetic fibres.

14. Process according to claim 12, the sheath exhibits a wide, open mesh to hold tight the wound sheet whilst covering less than 30% of the surface of the wound sheet to make it possible to impregnate the compressed wound sheet with a resin without having to remove said sheath and to obtain a porous tube, optionally reinforced by said sheath.

15. Process according to claims 1, wherein the wound non-woven sheet is compressed, continuously and cold, and is introduced into a metal tube in which it is subjected to said thermal treatment at a temperature between 100° and 400° C., to solidify its structure.

16. Process according to claim 15, wherein the metal tube is integral with the compression means and is provided with heating means enabling the compressed wound sheet to be thermally treated to deliver, continuously, a fibrous substrate profile having a solidified texture.

17. Process according to claim 15, wherein the said metal tube containing the compressed wound sheet is placed in an oven for the thermal treatment and the metaltube is withdrawn in order to be re-used.

18. Process according to claim 1, wherein the wound non-woven sheet is compressed, continuously and hot, at a temperature between 200° and 500° C., to obtain directly a fibrous substrate profile having a solidified texture.

19. Process according to any one of claims 15 to 17, wherein the said compression means are constituted by a die made from PTFE.

20. Process according to claim 1, wherein the resin is a resin giving an amount of carbon greater than 30% after carbonisation, which resin is selected from the group consisting of phenolic resins, furan resins and pitch-furfural mixtures catalysed with ethyl sulphate.

21. Process according to claim 1, wherein the fibrous substrate profile having a solidified texture is continuously impregnated with resin and the resin is continuously polymerised, at least partially, in order to obtain profiles which can be easily handled.

22. Process according to claim 1, wherein the mandrel is a rod or a tube made from metal or metal alloy, in which the rigid profile provided with its mandrel is carbonised at a temperature between 700° and 1300° C. to decrease the rugosity of the inner surface of the porous tube by virtue of the relative greater expansion of the mandrel due to a difference in expansion coefficient between the mandrel and the rigid profile or the final porous tube.

* * * * *